(12) United States Patent
Sugiura (10) Patent No.: US 7,360,939 B2
(45) Date of Patent: Apr. 22, 2008

(54) SURFACE EMITTING DEVICE, BACKSIDE ILLUMINATION DEVICE, AND LIQUID CRYSTAL DISPLAY DEVICE

(75) Inventor: Takuro Sugiura, Fukushima-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 92 days.

(21) Appl. No.: 11/230,333

(22) Filed: Sep. 15, 2005

(65) Prior Publication Data

US 2006/0109686 A1    May 25, 2006

(51) Int. Cl.
*F21V 8/00* (2006.01)

(52) U.S. Cl. ............. 362/620; 362/600; 362/619; 362/626; 349/57; 349/65

(58) Field of Classification Search ............ 362/620, 362/23, 26, 30, 330, 339, 600, 603, 607, 362/609, 610, 611, 615, 617, 619, 623, 625, 362/626; 349/57, 60, 65
See application file for complete search history.

(56) References Cited

U.S. PATENT DOCUMENTS

| | | | |
|---|---|---|---|
| 5,572,411 A * | 11/1996 | Watai et al. ............. 362/620 |
| 6,123,431 A * | 9/2000 | Teragaki et al. .......... 362/625 |
| 6,606,133 B1 * | 8/2003 | Okabe ..................... 349/65 |
| 6,825,896 B2 * | 11/2004 | Goto et al. ............... 349/65 |
| 6,836,303 B2 * | 12/2004 | Kim ........................ 349/65 |
| 2002/0181222 A1 * | 12/2002 | Boyd et al. ............... 362/31 |
| 2003/0160911 A1 | 8/2003 | Kano |
| 2004/0076396 A1 * | 4/2004 | Suga ....................... 385/146 |
| 2004/0109105 A1 * | 6/2004 | Nagakubo et al. ......... 349/65 |

* cited by examiner

*Primary Examiner*—Sandra O'Shea
*Assistant Examiner*—Mary Zettl
(74) *Attorney, Agent, or Firm*—Brinks Hofer Gilson & Lione (57) ABSTRACT

At the light emission surface of a light-guiding plate, first and second grooves and second grooves are formed. Each of the first grooves has a pair of slope parts, and each slope part has an easy slope and a steep slope. The second grooves intersect the first grooves at predetermined angles. Each of the second grooves has a pair of slope parts, and each slope part has an easy slope and a steep slope. With the first grooves and the second grooves intersecting each other, at the light emission surface, a plurality of minute prisms are formed in flat quadrangular pyramid shapes to be dented toward the surface opposite to the light emission surface of the light-guiding plate.

5 Claims, 6 Drawing Sheets

| TITLE | CUT 1 SIDE SURFACE | | | | CUT 2 SIDE SURFACE | | | | CROSS ANGLE $\theta$ |
|---|---|---|---|---|---|---|---|---|---|
| | $a_1(°)$ | $b_1(°)$ | PRISM SLOPE | PITCH P1 (mm) | $a_2(°)$ | $b_2(°)$ | PRISM SLOPE | PITCH P2 (mm) | |
| PREPARATION EXAMPLE 1 | 2.5 | 50.0 | 23° | 0.200 | 2.5 | 50.0 | -23° | 0.200 | 46° | a = EASY SLOPE ANGLE
b = STEEP SLOPE ANGLE
P = DISTANCE BETWEEN CONVEXES OF PRISM OR DISTANCE BETWEEN CONCAVES OF PRISM

SEE FOLLOWING DRAWING WITH RESPECT TO CUT SURFACE

FIG. 8

SURFACE EMITTING DEVICE, BACKSIDE ILLUMINATION DEVICE, AND LIQUID CRYSTAL DISPLAY DEVICE

This application claims the benefit of priority to Japanese Patent Application No. 2004-271539 filed on Sep. 17, 2004, herein incorporated by reference.

BACKGROUND OF THE INVENTION

1. Field of the Invention

The present invention relates to a surface emitting device, which emits planar light by a light-guiding plate, and to a backside illumination device and a liquid crystal display device using the same.

2. Description of the Related Art

For example, in order to illuminate brightly liquid crystal display panels mounted on cellular phones, mobile game machines, and the like, a surface emitting device using a light-guiding plate with a plurality of minute grooves formed at the surface thereof (See Japanese Unexamined Patent Application Publication No. 2003-257229). The surface emitting device has a configuration in which light from a light source formed adjacent to a side end surface of a flat light-guiding plate is incident on the light-guiding plate and is emitted from a light emission surface of the light-guiding plate. For this reason, at the light emission surface, a plurality of grooves (prisms), each having an easy slope and a steep slope expending in a direction perpendicular to the incident direction of light, are formed so as to refract and emit light propagating through the light-guiding plate toward the light emission surface.

However, when the surface emitting device disclosed in Japanese Unexamined Patent Application Publication No. 2003-257229 is used to illuminate the liquid crystal display panel, there is a problem in that a moire pattern(interference fringes) occurs due to the interference between liquid crystal pixels and the minute grooves (prisms) formed at the light emission surface. Further, since the plurality of minute grooves are formed to extend in the direction perpendicular to the propagation direction of light incident from the light source, the further the distance from the light source is, the smaller the amount of light on both sides of the light-guiding plate is, which causes triangular umbrae.

SUMMARY OF THE INVENTION

The invention has been made in view of the above-described problems, and it is an object of the invention to provide a surface emitting device which can emit a uniform amount of light from an entire light emission surface of a light-guiding plate, without unevenness and umbrae, and which can prevent a moire pattern from occurring even when being combined with a liquid crystal display panel.

In order to achieve the above-described object, according to a first aspect of the invention, a surface emitting device includes a light source and a light-guiding plate, in which light irradiated from the light source is incident from its side end surface, propagates through the inside thereof, and is emitted from a light emission surface thereof. A plurality of minute prisms having substantially quadrangular pyramid shapes are formed at the light emission surface by a plurality of first grooves and a plurality of second grooves that extend in a first direction and a second direction intersecting each other at a predetermined angle along the light emission surface so as to intersect each other. Here, each prism having a pair of slope parts, and each slope part has an easy slope and a steep slope inclined with respect to the light emission surface.

It is preferable that the first grooves and the second grooves intersect each other in a range of from 10° to 90°.

According to a second aspect of the invention, a backside illumination device includes a reflecting plate that is formed to face the light emission surface of the light-guiding plate of the surface emitting device, and a prism sheet that is formed to face a surface opposite to the light emission surface of the light-guiding plate. Further, according to a third aspect of the invention, a liquid crystal display device includes the above-described backside illumination device and a liquid crystal display panel.

Further, according to a fourth aspect of the invention, a front-side illumination device includes the light-guiding plate of the surface emitting device according to the first aspect of the invention. In addition, according to a fifth aspect of the invention, a liquid crystal display device includes the front-side illumination device and a reflective liquid crystal display unit.

DESCRIPTION OF THE PREFERRED EMBODIMENT

Figure 1:
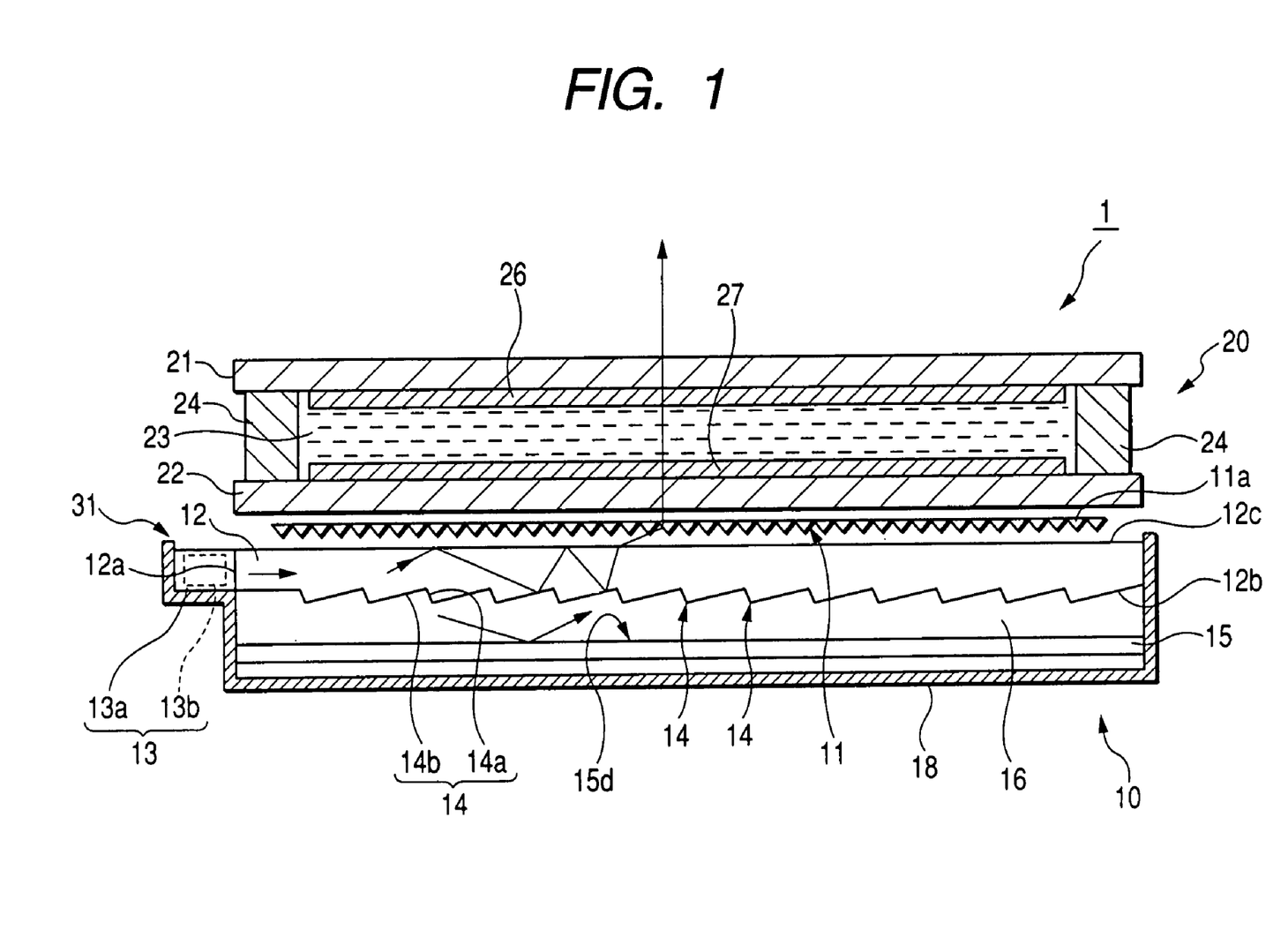
FIG. 1 is a cross-sectional view showing a liquid crystal display device having a surface emitting device according to the invention.

Embodiments of the invention will now be described with reference to the drawings. FIG. 1 is a cross-sectional view showing a backside illumination device using a surface emitting device according to an embodiment of the invention and a liquid crystal display device having the backside illumination device. The liquid crystal display device 1 of the present embodiment schematically includes a liquid crystal display unit 20, a backlight (backside illumination device) 10 that is disposed at the back side (lower side) of the liquid crystal display unit 20 to illuminate the liquid crystal display unit 20 from the backside thereof, and a prism sheet 11 that is formed between the liquid crystal display unit 20 and the backlight 10.

The liquid crystal display unit 20 is a transmissive or translucent type and is schematically formed by bonding a first substrate 21 and a second substrate 22 with a sealant 24 in a single body. The first substrate 21 and the second substrate 22 face each other with a liquid crystal layer 23 interposed therebetween. On the first substrate 21 and the second substrate 22 facing the liquid crystal layer 23, display circuits 26 and 27 are formed, respectively.

Though not shown, each of the display circuits 26 and 27 has an electrode layer, made of a transparent conductive film, that drives the liquid crystal layer 23, an orientation film that controls the orientation of the liquid crystal layer 23, or the like. Further, in some cases, each of the display circuit 26 and 27 may have color filters that perform color display, or the like.

The backlight (backside illumination device) 10 schematically has a surface emitting device 31 that a substantially planar light-guiding plate 12 and a light source 13 for allowing light to be incident on the light-guiding plate 12, a reflector (reflecting plate) 15 that reflects light emitted from the light-guiding plate 12 toward the liquid crystal display unit 20; and a holding member 18 that holds the surface emitting device 31 and the reflector 15. The light source 13 constituting the surface emitting device 31 is disposed on the side end surface 12a that introduces light into the light-guiding plate 12, and the reflector (reflecting plate) 15 is provided on a light emission surface (lower surface) 12b of the light-guiding plate 12 via an air layer 16 (see FIG. 1).

Figure 2:
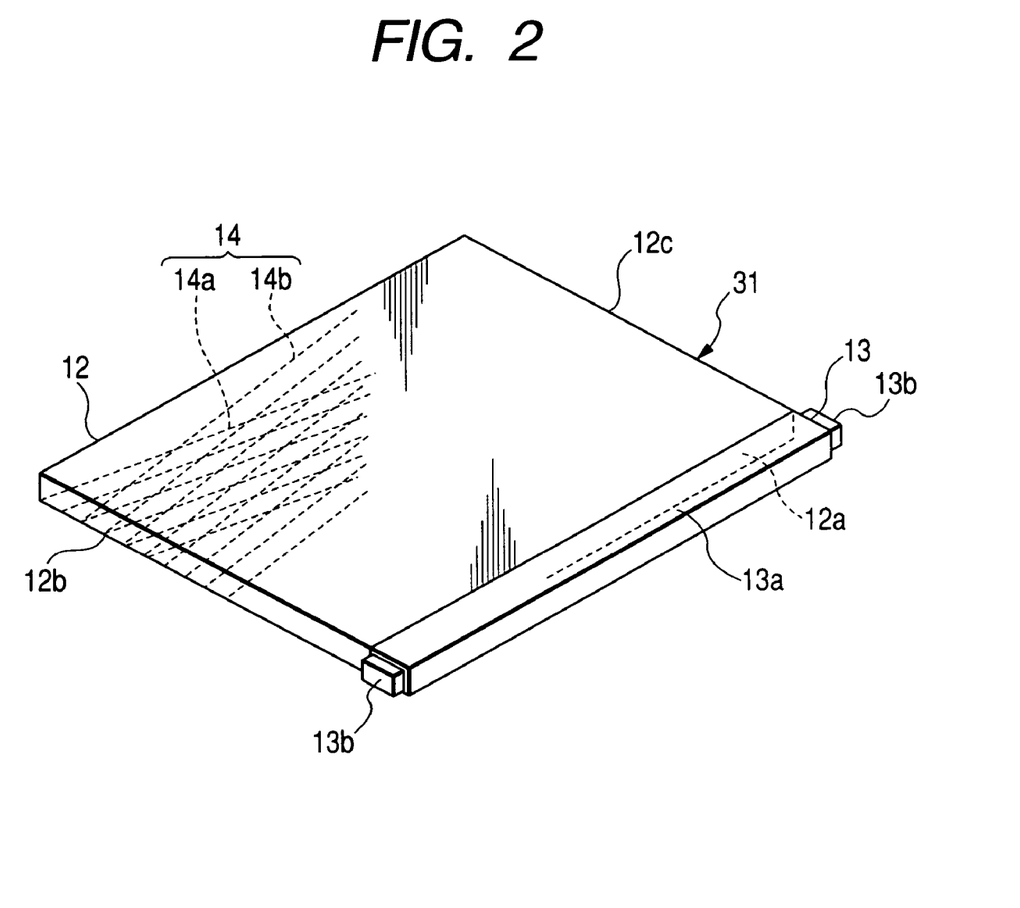
FIG. 2 is a perspective view showing the appearance of the surface emitting device of the invention.

FIG. 2 is a perspective view showing the appearance of the surface emitting device 31 included in the backlight 10. The surface emitting device 31 has the substantially planar, transparent light-guiding plate 12, a bar-shaped light-guiding member (intermediate light-guiding member) 13a that is provided along the side end surface 12a thereof, and a light-emitting element 13b that is provided on at least one of end surfaces of the bar-shaped light-guiding member 13a in its lengthwise direction. That is, the light-emitting element 13b and the bar-shaped light-guiding member 13a constitute the light source 13, and the side end surface 12a of the light-guiding plate 12 constitutes a light incident surface (incident surface) of the light-guiding plate.

The light-guiding plate 12 is disposed on the back side (lower surface side in FIG. 1) of a display region of the liquid crystal display unit 20, as shown in FIGS. 1 and 2, and is made of a planar transparent acrylic resin, or the like. The light-guiding plate 12 emits light emitted from the light source 13 from the light emission surfaces 12b and 12c, such that light emitted from one of the light emission surfaces 12b and 12c is irradiated onto the reflector 15 to be reflected therefrom and light from the other light emission surface is illuminated on the overlying prism sheet 11. At the light emission surface 12b of the light-guiding plate 12, a plurality of first grooves 14a and a plurality of second grooves 14b intersecting each other at a predetermined angle are formed so as to form prism shapes, and the surface (opposite surface or top surface) 12c opposite to the light emission surface 12b is formed to have a flat surface. Further, since the amount and the emission angle of light emitted from the light emission surface 12b are almost equal to those of light emitted from the light emission surface 12c, the light emission surface 12b can be planarly formed and the opposite surface 12c can have the above-described prism shapes. In this case, the same effects can be obtained.

Figure 3:
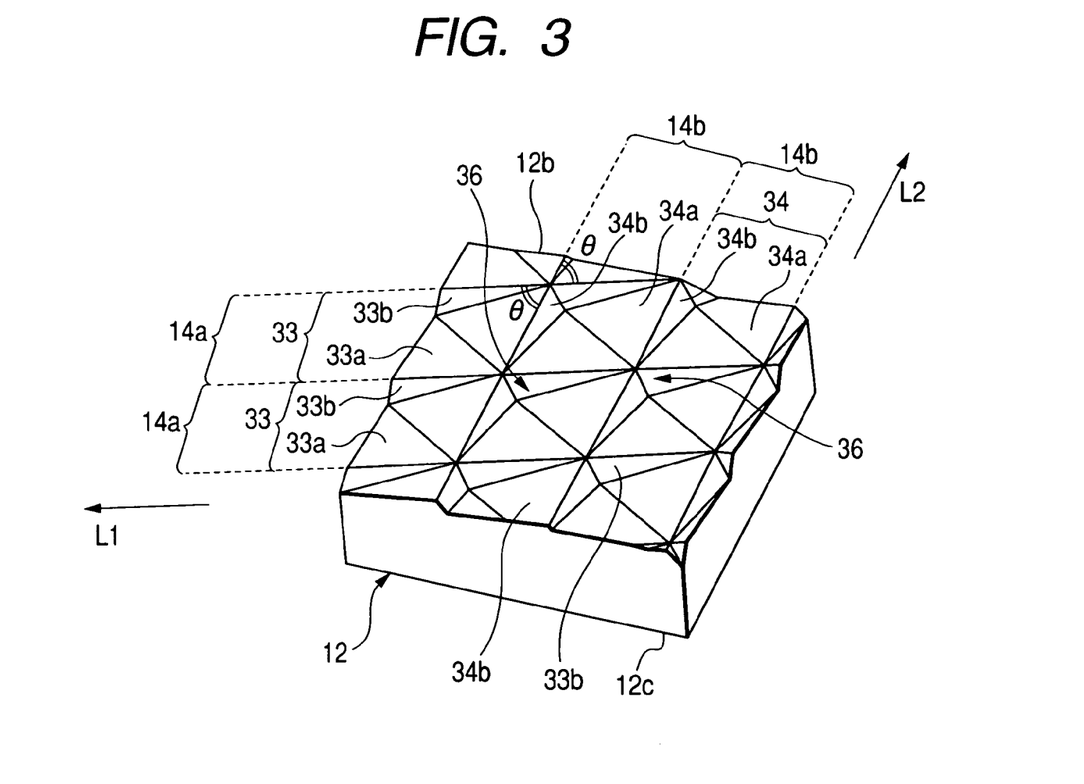
FIG. 3 is an expanded perspective view showing a shape of a light emission surface of the surface emitting device shown in FIG. 2.

FIG. 3 is an expanded perspective view showing the state of the light emission surface 12b of the light-guiding plate 12. At the light emission surface 12b of the light-guiding plate 12, the plurality of first grooves 14a and the plurality of second grooves 14b are formed. Each of the first grooves 14a has a pair of slope parts 33, and each slope part 33 has an easy slope 33a and a steep slope 33b. The second grooves 14b intersect the first grooves 14a at the predetermined angles, each having a pair of slope parts 34. Each slope part 34 has an easy slope 34a and a steep slope 34b. With the intersections of the first grooves 14a extending in a first direction L1 and the second grooves 14b extending in a second direction L2, at the light emission surface 12b, a plurality of minute prisms 36 are formed in flat quadrangular pyramid shapes to be dented toward the opposite surface 12c of the light-guiding plate 12. The steep slope 33b constituting the first groove 14a and the steep slopes 34b constituting the second groove 14b are all disposed closer to the light source side than the easy slopes 33a and 34a.

Figure 5:
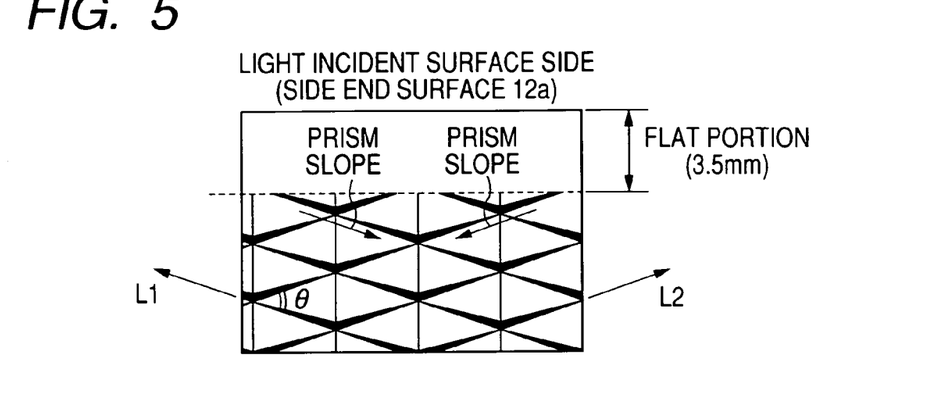
FIG. 5 is a plan view showing an example of the invention.

The cross angle θ (see FIG. 3) of the first groove 14a and the second groove 14b, which have the easy slopes and the steep slopes and intersect each other, may be set to, for example, 10° to 90°. When the cross angle θ is smaller than 10°, it is not preferable because a moire pattern tends to occur and luminance uniformity deteriorates. Further, when the cross angle θ is larger than 90°, it is not preferable because luminance deteriorates. Further, as shown in FIG. 5, the slope angle of the prism to the side end surface 12a of the light-guiding plate 12 may be set to 5° to 45°. When the slope angle is smaller than 5°, it is not preferable because a moire pattern tends to occur and luminance uniformity deteriorates. Further, when the slope angle is larger than 45°, it is not preferable because luminance deteriorates. In addition, each steep slope 33b slopes toward the light source 13 from the light emission surface 12b. The minute prism 36, which is formed in the flat quadrangular pyramid shape by the grooves 14a and 14b intersecting each other, diffuses and emits light to be emitted from the light emission surface 12b. Such the action of the prism formed in the light emission surface 12b effectively prevents the moire pattern from occurring due to the interference between the prism and pixel of the liquid crystal display unit 20 when light is illuminated onto the liquid crystal display unit 20 from the back side thereof.

Further, light is diffused and emitted from the light emission surface 12b by the action of the prism 36. Therefore, it is possible to prevent a triangular umbra from occurring when the further the distance from the light source 13 is, the smaller the amount of light on both sides of the light-guiding plate 12 is. As a result, a uniform amount of light from both the light emission surface 12b and the opposite surface 12c can be illuminated onto the reflector 15 and the prism sheet 11, without unevenness. When the surface emitting device 31 according to the invention is used, the entire display surface of the liquid crystal display unit 20 can be illuminated with the uniform amount of light, without unevenness. Therefore, a liquid crystal display device having high-level visibility can be realized, without causing the moire pattern.

Figure 4:
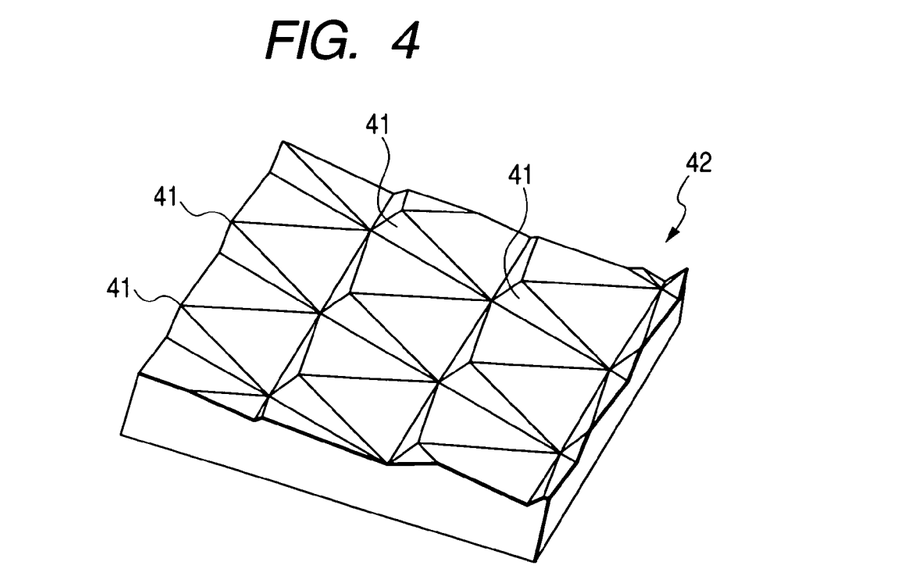
FIG. 4 is an expanded perspective view showing an example of a mold which is used to form a light-guiding plate.

Moreover, the light-guiding plate 12 in the surface emitting device 31 according to the invention may be obtained by forming the prisms 36 by pressing a resin plate before hardening with a mold 42 having inverse shapes of the prisms 36 and a plurality of quadrangular pyramids 41 protruding upward and then by hardening the resin plate, as shown in FIG. 4. In this case, the prisms of the dented quadrangular pyramid shapes are formed at the surface of the light-guiding plate. However, since the directions and area ratios of the respective surfaces of the quadrangular pyramid shapes are important, even though protruding quadrangular pyramids are formed at the surface of the light-guiding plate so as to realize the equivalent values, it is possible to obtain the same effects.

Returning to FIG. 1, the prism sheet 11, which is formed to face the light emission surface 12c of the light-guiding plate 12 opposite to the light emission surface 12b, is provided with minute prisms 11a formed at the surface thereof. The prism sheet 11 refracts light emitted from the opposite surface 12c of the light-guiding plate 12 in a normal direction. In such a manner, it is possible to introduce light in the normal direction into the liquid crystal display unit 20. The light-guiding plate 12 having the above-described configuration can be properly used for a front-side illumination device. In this case, however, it is preferable to form prisms at the surface opposite to the light emission surface (lower surface), and steep slopes of the prisms slope toward the opposite side to the light source from the opposite surface.

Figure 8:
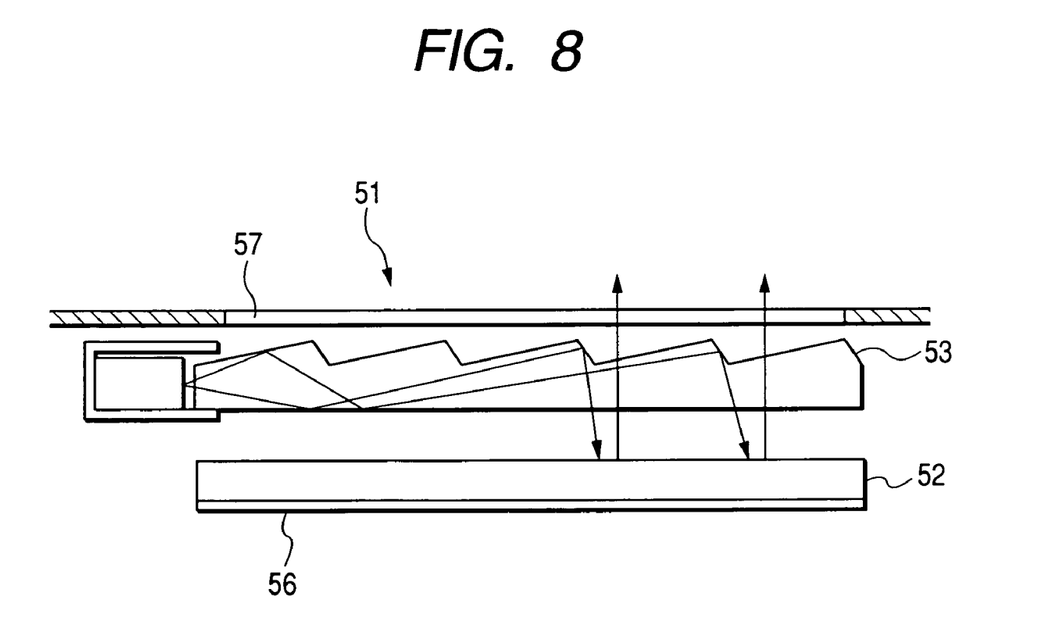
FIG. 8 is a cross-sectional view showing a liquid crystal display device having a surface emitting device according to another embodiment of the invention.

Moreover, the surface emitting device of the invention can also be applied as a front-side illumination device. As shown in FIG. 8, a liquid crystal display device 51 schematically has a liquid crystal display unit 52, and a front light (front-side illumination device) 53 that is disposed at the front side (upper surface side) of the liquid crystal display unit 52 for illuminating the liquid crystal display unit 52 from the front side. Between the liquid crystal display unit 52 and the front light 53, any prism sheet is not formed.

According to the liquid crystal display device 51, illumination light irradiated from the front light (front-side illumination device) 53 passes through the liquid crystal display unit 52 and then is reflected by a built-in or external reflecting film 56 of the liquid crystal display unit 52 so as to illuminate again the liquid crystal display unit 52 from the back. Therefore, it is possible to observe the liquid crystal display unit 52 illuminated brightly from a cover glass 57 in front of the liquid crystal display unit 52.

In the liquid crystal display device 51, the light-guiding plate has a plurality of prism shapes formed by a plurality of first grooves 14a and a plurality of second grooves 14b intersecting each other at a predetermined angle, as shown in FIGS. 1 and 2. All the steep slopes 33b and 34b, which constitute the first grooves 14a and the second grooves 14b, respectively, are disposed away further from the light source than the easy slopes 33a and 34a, and the steep slopes 33b and 34b slope from the light emission surface toward the opposite side to the light source. For this reason, the entire display surface of the liquid crystal display device 51 can be illuminated with the uniform amount of light, without unevenness, and thus a liquid crystal display device having high-level visibility can be realized with no moire pattern. When the surface emitting device of the invention is used in the front light, the prism formation surface of the light-guiding plate is disposed at the opposite side to the liquid crystal display unit. Further, at the surface (liquid crystal display unit side) of the light-guiding plate, where any prism is not formed, an anti-reflecting film may be formed.

Figure 7:
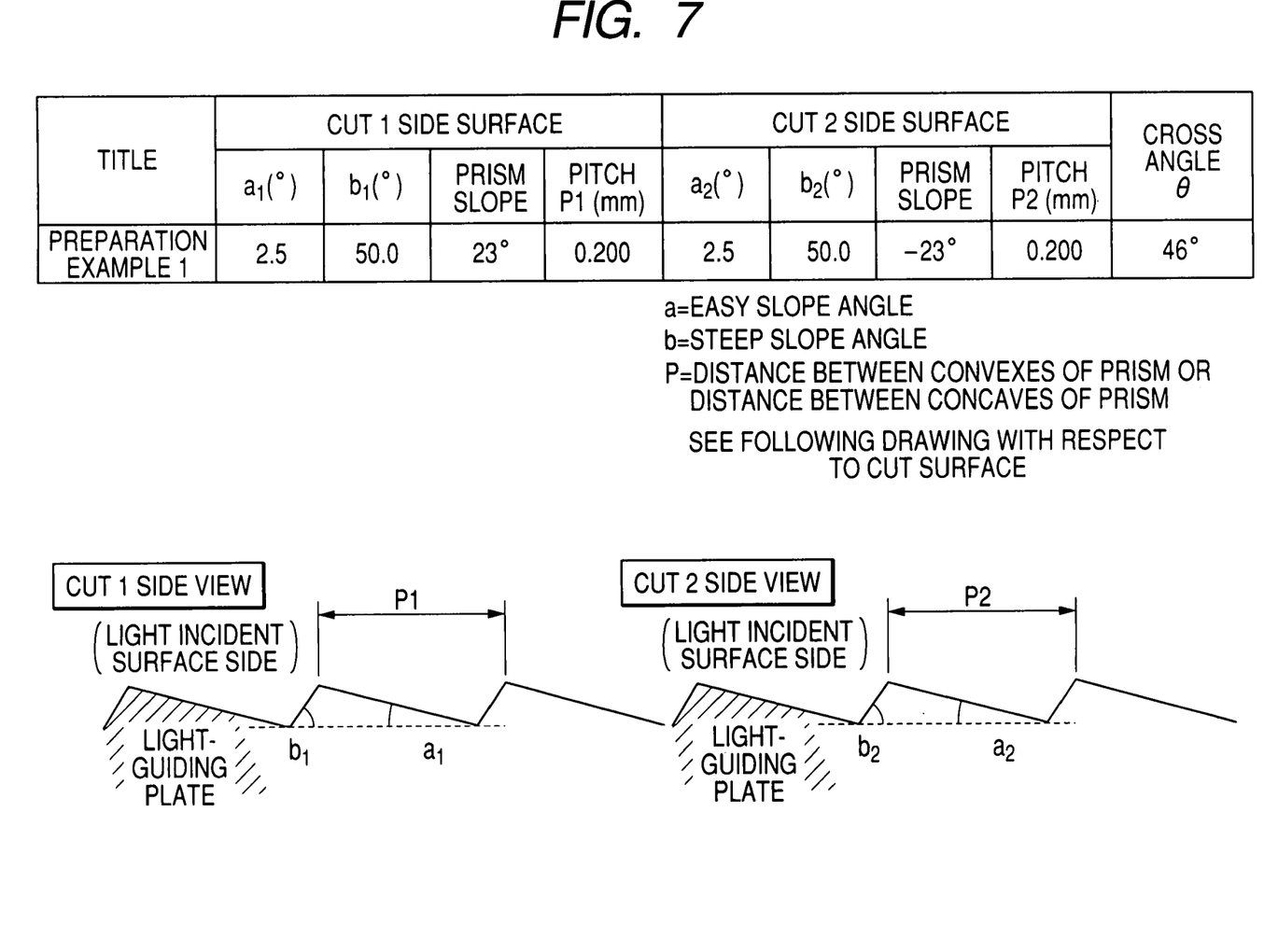
FIG. 7 is a diagram illustrating another example of the invention.

Preferably, the plurality of prisms, which are formed in the light-guiding plate of the surface emitting device of the invention by the plurality of first grooves and the plurality of second grooves intersecting each other, may be formed, for example, in shapes shown in the plan view of FIG. 5. All dimensions and angles of the respective parts in the above-described preparation example are shown in FIG. 7.

FIRST EXAMPLE

The applicant of the invention has verified the effects of the surface emitting device of the invention. For the verification, four kinds of light-guiding plates were prepared in which the light emission surfaces had minute prism shapes formed by setting the cross angle θ of the first groove 14a extending in the first direction L1 shown in FIG. 3 and the second groove 14b extending in the second direction L2 in the above-described preparation example to 32°, 46°, 60°, and 90°, respectively. Further, as a comparative example, a related art light-guiding plate was prepared to have the same configuration as the above-described examples, excluding stripe prism shapes (parallel prisms) formed in a direction perpendicular to a propagation direction of light from a light source by easy slopes (slope angle of 2.5°) and steep slopes (slope angle of 50°) so as to form a plurality of grooves, such that the easy slopes were disposed closer to the light source than the steep slopes.

Then, the above-described four kinds of light-guiding plates of the examples of the invention and the light-guiding plate of the comparative example are respectively connected to the light sources having the same amount of light so as to form surface emitting devices. Using each of these surface emitting devices as the backlight of the liquid crystal display unit, luminance and uniformity of light in a plane were measured by use of SR-3, which is available from Topcon Corporation, so as to visually evaluate display.

Figure 6:
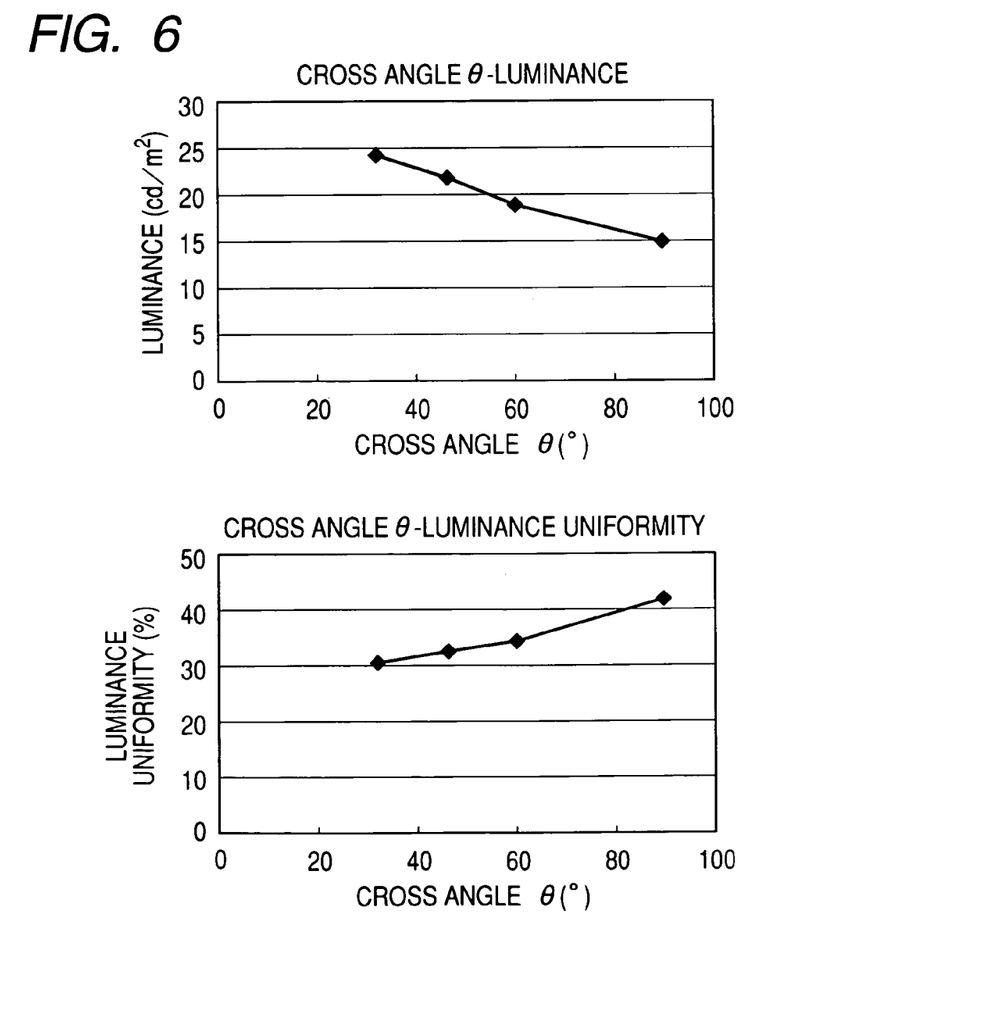
FIG. 6 is a graph showing verification results of the invention.

The verification result is shown in Table 1. Further, the correlation between the cross angle θ and luminance and the correlation between the cross angle θ and luminance uniformity are shown as graphs in FIG. 6.

TABLE 1

Measurement of Luminance in a state in which a backlight is assembled with an LCD.

| Cross angle θ (°) | Pitch (mm) | Luminance (cd/m$^2$) | Uniformity (%) | Moire | Uniformity (Visual) |
|---|---|---|---|---|---|
| Parallel Prism (Comparative example) | 0.15 | 22 | 45 | x | x |
| 32° | 0.15 | 25 | 31 | ○ | ○ |
| 46° | 0.20 | 22 | 33 | ○ | ● |
| 60° | 0.30 | 19 | 35 | ○ | ● |
| 90° | 0.30 | 15 | 42 | ○ | ● |

Luminance and Uniformity were measured by use of a luminance meter SR-3

Reference Of Visual Evaluation
● Great
○ Good
x Bad

According to the verification result shown in Table 1, when the cross angle θ was in a range of from 30° to 90°, good visibility, that is, display was obtained. In particular, when the cross angle θ was in a range of from 45° to 90°, the better result was obtained. On the other hand, in the surface emitting device using the related art light-guiding plate having parallel prisms, luminance uniformity measured by a luminance meter was of no matter, but uniformity by the visual evaluation was bad enough to generate the moire pattern, which causes a problem in display. In such a manner, the effects of the surface emitting device of the invention were confirmed.

According to the surface emitting device, the minute prisms formed in the flat quadrangular pyramid shapes by the first grooves and the second grooves intersecting each other diffuse and emit light from the light emission surface of the light-guiding plate. With the action of the prism formed in the light emission surface, when the surface emitting device illuminates the liquid crystal display unit from the back surface thereof, the surface emitting device effectively prevents the moire pattern from occurring due to the interference between the pixel of the liquid crystal display unit and the prism.

Further, since light from the light emission surface of the light-guiding plate is diffused and emitted by the action of the prism, it is possible to prevent the triangular umbra from occurring when the further the distance from the light source is, the smaller the amount of light on both sides of the light-guiding plate is. Therefore, the uniform amount of light from the entire light emission surface can be illuminated, without unevenness. As a result, it is possible to illuminate the entire display surface of the liquid crystal display unit with the uniform amount of light, without unevenness, and thus to realize a liquid crystal display device having high-level visibility.

The invention claimed is:

1. A surface emitting device comprising:
a light source; and
a light-guiding plate having a side end surface for introducing light irradiated from the light source, a flat surface, and a light emission surface facing the flat surface, for propagating the incident light from the light source through an interior portion thereof, and emitting the light;
wherein a plurality of minute prisms, each having a shape of a substantially quadrangular pyramid, are formed at the light emission surface by a plurality of first grooves and a plurality of second grooves that extend in a first direction and a second direction, and intersect each other at a predetermined angle, and
the quadrangular prism having a first easy slope surface parallel with the first direction, a second steep slope surface parallel with the first direction, a third easy slope surface parallel with the second direction, and a fourth steep slope surface parallel with the second direction; and
the first and third easy slope surfaces disposed at a light source side, and inclined at a predetermined angle with respect to the side end surface.

2. The surface emitting device according to claim 1, wherein the first grooves and the second grooves intersect each other in a range of from 10° to 90°.

3. The surface emitting device according to claim 1, wherein the slope angle with respect to the side end surface of the light-guiding plate is in a range of from 5° to 45°.

4. A liquid crystal display device comprising:
a backside illumination device that reflects light from a light source on the first and third easy slope surfaces of the light emission surface of the light-guiding plate in the surface emitting device according to claim 1, the backside illumination device including
a prism sheet configured to face the flat surface; and
a liquid crystal display unit provided on an upper surface of the backside of the illumination device.

5. A liquid crystal display device comprising:
the front-side illumination device that is formed by arranging the light emission surface of the light-guiding plate in the surface emitting device according to claim 1 toward an external observation side and reflects light from the light source in a direction of the flat surface on the second and fourth steep slope surfaces, wherein
the flat surface is disposed at a lower side; and
a reflective liquid crystal display unit is provided on a lower surface of the front-side illumination device.

* * * * *